United States Patent
Zhang et al.

(10) Patent No.: US 10,061,309 B1
(45) Date of Patent: Aug. 28, 2018

(54) COGNITIVE PRESS-FIT FORCE ANALYZER AND MONITORING SYSTEM

(71) Applicant: International Business Machines Corporation, Armonk, NY (US)

(72) Inventors: WeiFeng Zhang, Shenzhen (CN); Guo Wei, Shenzhen (CN); Lin Zhao, Shenzhen (CN); Zhipeng Wang, Zhongshan (CN); Qiuyi Yu, Shenzhen (CN); Zhongfeng Yang, Shenzhen (CN); YanLong Hou, Shenzhen (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/841,869

(22) Filed: Dec. 14, 2017

Related U.S. Application Data (63) Continuation of application No. 15/677,051, filed on Aug. 15, 2017.

(51) Int. Cl.
*G06F 19/00* (2018.01)
*G05B 19/418* (2006.01)

(52) U.S. Cl.
CPC ............ *G05B 19/41885* (2013.01); *G05B 2219/42058* (2013.01); *G05B 2219/45026* (2013.01)

(58) Field of Classification Search
CPC .... G05B 19/41885; G05B 2219/42058; G05B 2219/45026

(Continued)

(56) References Cited

U.S. PATENT DOCUMENTS

| 2005/0037644 A1 | 2/2005 | Ravert, Jr. et al. |
| 2005/0162840 A1* | 7/2005 | Morita ........... H05K 1/028 361/784 |

(Continued)

FOREIGN PATENT DOCUMENTS

| CN | 201255674 Y | 6/2009 |
| CN | 101937203 A | 1/2011 |

(Continued)

OTHER PUBLICATIONS

Becerra et al., "Press Fit Technology Roadmap and Control Parameters for a High Performance Process", Flextronics International Inc., IPC APEX EXPO 2015, <https://www.smtnet.com/library/files/upload/press-fit-tech-roadmap-1.pdf>, 39 pages, printed Apr. 13, 2017.

(Continued)

Primary Examiner — Ziaul Karim
(74) Attorney, Agent, or Firm — Monchai Chuaychoo (57) ABSTRACT

In an approach to creating a press-fit force analysis, one or more computer processors retrieve a force press-fit data from a press-fit machine based on a press cycle. One or more computer processors calculate a deformation force of the press cycle based on the press-fit data and storing the deformation force. One or more computer processors create a predictive control model based on the deformation force and determine if a corrective action is required based on at least one of a raw material quality data, machine setting data, a completed lot quality data or the predictive control model. One or more computer processors determine if a corrective action is required and alert a downstream process to take the corrective action. One or more computer processors schedule a material kitting.

1 Claim, 5 Drawing Sheets

(58) Field of Classification Search
USPC .......................................................... 700/121
See application file for complete search history.

(56) References Cited

U.S. PATENT DOCUMENTS

| | | | |
|---|---|---|---|
| 2008/0318453 A1 | 12/2008 | Dancison | |
| 2012/0298730 A1* | 11/2012 | Berchtold | H01L 24/27 228/262 |
| 2014/0163664 A1* | 6/2014 | Goldsmith | A61B 17/00491 623/1.11 |
| 2014/0165745 A1 | 6/2014 | Pascucci et al. | |
| 2014/0345124 A1 | 11/2014 | Patzner et al. | |

FOREIGN PATENT DOCUMENTS

| | | |
|---|---|---|
| CN | 201760743 U | 3/2011 |
| CN | 202335089 U | 7/2012 |
| CN | 203448959 U | 2/2014 |
| DE | 4100410 A1 | 7/1992 |

OTHER PUBLICATIONS

"Press Force Monitoring & Analysis", A-TECH Instruments Ltd., printed Apr. 13, 2017, 5 pages, <http://www.a-tech.ca/Product/Solution/3/Press_Force_Monitoring_Analysis/>.

Zhang et al., "Cognitive Press-Fit Force Analyzer and Monitoring System", U.S. Appl. No. 15/677,051, filed Aug. 15, 2017, 35 pages.

IBM, Appendix P, list of patents or patent applications treated as related, filed herewith, 2 pages.

You et al., "Prediction of Pressing Quality for Press-Fit Assembly Based on Press-Fit Curve and Maximum Press-Mounting Force", International Journal of Aerospace Engineering vol. 2015 (2015), Article ID 823019, 14 pages <http://dx.doi.org/10.1155/2015/823019>.

* cited by examiner

COGNITIVE PRESS-FIT FORCE ANALYZER AND MONITORING SYSTEM

BACKGROUND OF THE INVENTION

The present invention relates generally to the field of press-fit machines and more particularly to controlling and monitoring press-fit machines in printed circuit board manufacturing.

Press-fit technology allows manufacturers to avoid soldering when assembling printed circuit board (PCB) electronics. The press-fit connection is formed when a pin is pressed into a fitted, plated-through hole in a PCB. There are different types of press-fit connectors, including those with solid pins (which do not contort during insertion) and compliant pins (which compress or "comply" during insertion). Press-fit connectors are utilized in various applications, from data and communication to transportation and mechanics. However, due to their dependable structure and numerous advantages over solderless technology, press-fit technology is preferred in printed circuit board assembly (PCBA) manufacturing.

When the solid press-fit technology was introduced 25 years ago, it revolutionized the industry. However, after a while, designers and manufacturers were concerned about the board damage caused by the solid press-fit contacts. There are several drawbacks to the current press-fit technology employed in the printed circuit board assembly (PCBA) industry. First, using a Tyco MEP-12T machine as an example, the force values of the press-fit machine after pin insertion must be read manually by the machine operator in order to determine the maximum deformation force. Thus, it is very difficult for the operator to precisely determine the level of the maximum deformation force during pin insertion. Second, the press sequence control program only can give a "qualitative" result of whether the press curve is "Good" or "Not Good". For example, using a Tyco MEP-12T machine, operator cannot automatically distinguish the "quantitative" reading of the maximum deformation force of the force curve. Third, there is no solution to integrate the maximum deformation force and to compare to the connector minimum and maximum force specifications. Fourth, the press fit quality issue occurred in electronic card assembly and test (ECAT) or PCBA assembly is typically caused by the downstream process of printed circuit board (PCB) fabrication or connector fabrication. For example, the ECAT assembly is "reactive" to the process variance to the downstream process. Thus, there is no predictive solution to pre-alert the potential process deviation in downstream process.

SUMMARY

Embodiments of the present invention disclose a method for cognitive press-fit force analyzer and monitoring system. The method may include one or more computer processors retrieving, by one or more computer processors, retrieve press-fit data associated with a press-fit machine and based on a press cycle. The one or more computer processors calculate a deformation force of the press cycle based on the press-fit data and storing the deformation force. The one or more computer processors create, a predictive control model based on the deformation force. The one or more computer processors determine if a corrective action is required based on at least one of a raw material quality data, machine setting data, a completed lot quality data or the predictive control model. The one or more computer processors, responsive to determine a corrective action is required, alert a downstream process to take the corrective action. The one or more computer processors schedule a material kitting based on at least one of the raw material quality data, the machine setting data, the completed lot quality data or the predictive control model.

DETAILED DESCRIPTION

Embodiments of the present invention recognize that improvements to press fit analysis and monitor systems may be made by using a cognitive algorithm to control the testing and manufacturing process of PCBs. These improvements lie in the embodiment's ability to monitor and control the criteria, maximum and minimum force, the quality and the stability of the press-fit process. In addition, the embodiments have the ability to forecast the impact to the downstream process and choose the incoming materials to match the current press force setting of the press fit machine. Implementation of embodiments of the invention may take a variety of forms, and exemplary implementation details are discussed subsequently with reference to the Figures.

Figure 1:
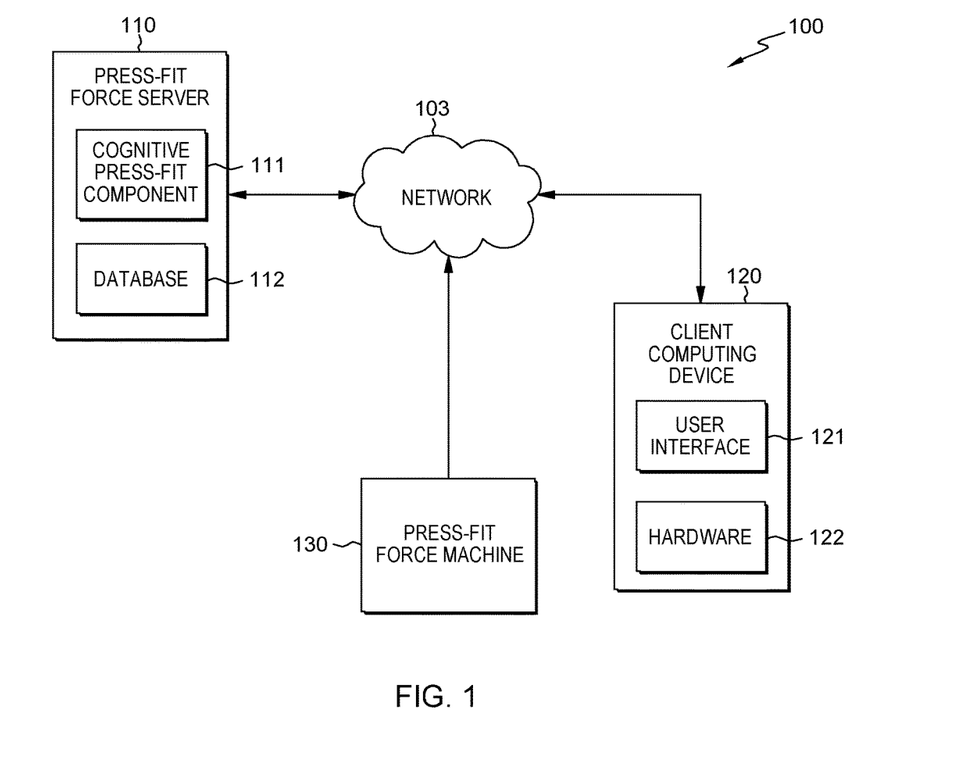
FIG. 1 is a functional block diagram illustrating a cognitive press-fit analyzer data processing environment, in accordance with an embodiment of the present invention.

FIG. 1 is a functional block diagram illustrating a cognitive press-fit analyzer data processing environment, generally designated 100, in accordance with one embodiment of the present invention. FIG. 1 provides only an illustration of one implementation and does not imply any limitations with regards to the environments in which different embodiments may be implemented. Many modifications to the depicted environment may be made by those skilled in the art without departing from the scope of the invention as recited by the claims.

Cognitive press-fit analyzer data processing environment 100 includes press-fit force server 110, client computing device 120 and press-fit force machine 130 all interconnected over network 103. Network 103 can be, for example, a telecommunications network, a local area network (LAN), a wide area network (WAN), such as the Internet, or a combination of the three, and can include wired, wireless, or fiber optic connections. Network 103 can include one or more wired and/or wireless networks that are capable of receiving and transmitting data, voice, and/or video signals, including multimedia signals that include voice, data, and video information. In general, network 103 can be any combination of connections and protocols that will support communications between press-fit force server 110, client computing device 120, press-fit force machine 130 and other computing devices (not shown) within cognitive press-fit analyzer data processing environment 100.

Press-fit force server 110 can be a standalone computing device, a management server, a web server, a mobile computing device, or any other electronic device or computing system capable of receiving, sending, and processing data. In other embodiments, press-fit force server 110 can represent a server computing system utilizing multiple computers as a server system, such as in a cloud computing environment. In another embodiment, press-fit force server 110 can be a laptop computer, a tablet computer, a netbook computer, a personal computer (PC), a desktop computer, a personal digital assistant (PDA), a smart phone, or any other programmable electronic device capable of communicating with client computing device 120, and other computing devices (not shown) within cognitive press-fit analyzer data processing environment 100 via network 103. In another embodiment, press-fit force server 110 represents a computing system utilizing clustered computers and components (e.g., database server computers, application server computers, etc.) that act as a single pool of seamless resources when accessed within cognitive press-fit analyzer data processing environment 100. Press-fit force server 110 includes cognitive press-fit component 111 and database 112.

In one aspect, cognitive press-fit component 111 can improve the quality and reduce defects during the process of fitting connectors to PCBs. This improvement lies in cognitive press-fit component's 111 ability to monitor and control the criteria of maximum and minimum press force, the quality, and stability of the press-fit process. In addition, the invention has the ability to forecast the impact to the downstream process and choose the incoming materials to match the current press force setting of the press-fit machine. In the depicted embodiment, cognitive press-fit component 111 resides on press-fit force server 110. In another embodiment, cognitive press-fit component 111 can reside on client computing device 120.

Database 112 is a repository for data used by cognitive press-fit component 111. In the depicted embodiment, database 112 resides on press-fit force server 110. In another embodiment, database 112 may reside elsewhere within cognitive press-fit analyzer data processing environment 100, provided that cognitive press-fit component 111 has access to database 112. Database 112 can be implemented with any type of storage device capable of storing data and configuration files that can be accessed and utilized by press-fit force server 110, such as a database server, a hard disk drive, or a flash memory. For example, database 112 may store information about a machine setting, a dataset from the connectors, and a dataset of PCB values.

Client computing device 120 can be a laptop computer, a tablet computer, a smart phone, or any programmable electronic mobile device capable of communicating with various components and devices within cognitive press-fit analyzer data processing environment 100, via network 103. In general, client computing device 120 represents any programmable electronic device or combination of programmable electronic devices capable of executing machine readable program instructions and communicating with other computing devices (not shown) within cognitive press-fit analyzer data processing environment 100 via a network, such as network 103. In the present embodiment, client computing device 120 may represent one or more computing devices. In another embodiment, client computing device 120 may include secondary computing devices (not shown) within cognitive press-fit analyzer data processing environment 100. The secondary computing devices can be used in conjunction with client computing device 120. Client computing device 120 includes user interface 121 and hardware 122. The secondary computing device includes user interface 121 and hardware 122.

User interface 121 provides an interface to cognitive press-fit component 111 on press-fit force server 110 for a user of client computing device 120. In the depicted embodiment, user interface 121 resides on client computing device 120. In another embodiment, user interface 121 may reside on a secondary computing device (not shown) within cognitive press-fit analyzer data processing environment 100. In one embodiment, user interface 121 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In another embodiment, user interface 121 may also be mobile application software that provides an interface between client computing device 120 and press-fit force server 110. Mobile application software, or an "app," is a computer program designed to run on smart phones, tablet computers, wearable computers and other mobile devices.

Hardware 122 provides an interface to interact and communicate with various machines. Machines can include, but is not limited to, a programmable logic control (PLC) machine, SCADA server, and inventory control machine. In the depicted embodiment, hardware 122 resides on client computing device 120. In another embodiment, hardware 122 resides on a secondary computing device (not shown) within cognitive press-fit analyzer data processing environment 100.

Press-fit force machine 130 can be any device that presses a contact pin into a PCB through hole without soldering. The pins utilized can be, but are not limited to, a solid pin or a compliant pin. In an embodiment, press-fit force machine 130 can be, but is not limited to, a Tyco MEP-12T.

Figure 2:
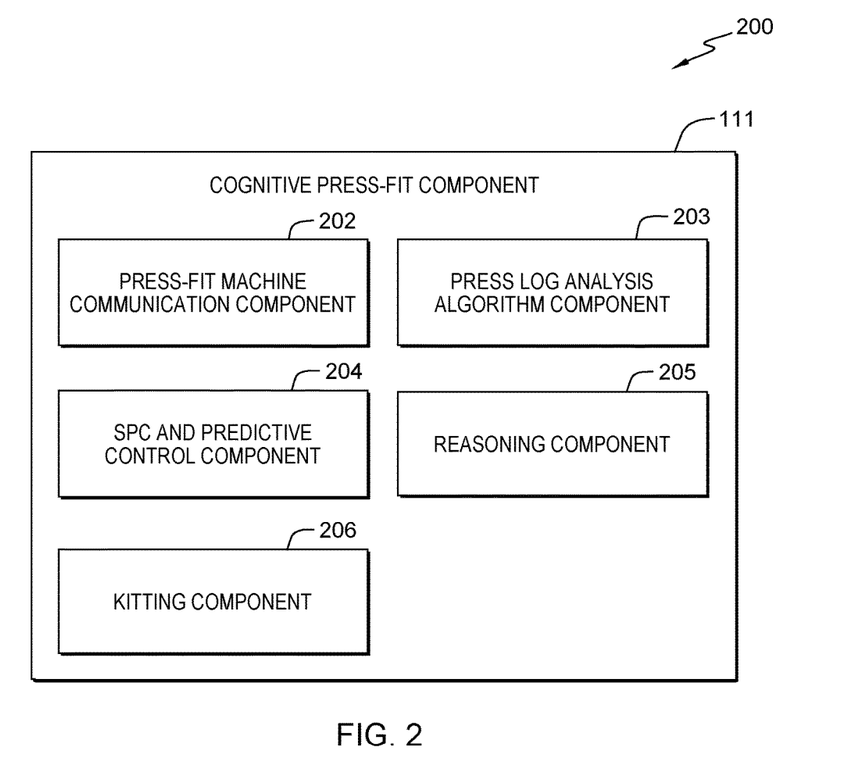
FIG. 2 is a functional block diagram illustrating a cognitive press-fit component, in accordance with an embodiment of the present invention.

FIG. 2 is a functional block diagram 200 illustrating a cognitive press-fit component 111 comprising press-fit machine communication component 202, press log analysis algorithm component 203, SPC and predictive control component 204, reasoning component 205 and kitting component 206.

Press-fit machine communication component 202 provides the capability of communicating to various devices on the network within cognitive press-fit analyzer data processing environment 100. Devices can include, but are not limited to, a programmable logic controller (PLC), a supervisory control and data acquisition (SCADA) server, and an inventory control machine. In an embodiment, press-fit machine communication component 202 can query and retrieve data from the press-fit machine 130 via network 103. In another embodiment, press-fit machine communication component 202 can generate a pre-alert signal and communicate to other devices for the downstream process.

Press log analysis algorithm component 203 provides the capability of analyzing the data from the press-fit machine 130 and determining the maximum deformation force of each run using an algorithm. Press log analysis algorithm component 203 utilizes a formula, $$NBPSL_{(n)} = n_{(NBP)} - n_{(ref)},$$

wherein $n_{(ref)}$ is an index of a reference deformation force data point;

$n_{(NBP)}$, "index for Next Bigger Point", is an index of a subsequent deformation force data point with a greater deformation force; and $NBPSL_{(n)}$, "Next Bigger Point Step Length of n", is a difference in the index of the subsequent deformation force data point and the reference deformation force data point to calculate the maximum step length (changed in a press cycle corresponding to the increasing change of the press force) based on a corresponding index of n. It is noted that the maximum calculated step length, $NBPSL_{(n)}$ directly corresponds to the maximum deformation force. Press force versus NBPSL chart 403 from FIG. 4 further illustrates the formula above. For example, the current index $n_{(ref)}$ is equal to 10. After determining $n_{(NBP)}$, is $n_{(10)}=18$, then $NBPSL_{(10)}=18-10$, which means that result step length of $NBPSL_{(10)}=8$. It is further noted that there may be other increasing slopes or step length beyond the index=18 of press force versus NBPSL chart 403.

In a further embodiment associated with the above formula, $NBPSL_{(n)} = n_{(NBP)} - n_{(ref)}$, a maximum deformation force can be calculated by using computer programming software. The steps are illustrated below in details:

Retrieve force data array from press fit machine's flat file in the form of (filename.pdc) as "Array_f":
"Array_f" is in the form of array as below where height data is optional.

TABLE #1

| Index# | Height# | Force# |
|---|---|---|
| 1 | Height#1 | Force#1 |
| 2 | Height#2 | Force#2 |
| . . . | . . . | . . . |
| Array_f.length | . . . | . . . |

Calculate NBPSL(n),n=1 to Array_f.length; And form array "Array_NPBSL": "Array_f.length" is the overall length of Table#1, or the number of rows in Table#1 (except the first title row).

This step will calculate the NBPSL for each point of n(n=1 to Array_f.length), then for each n, another table is created for the Array_NPBSL:

TABLE #2

| Index# | NBPSL |
|---|---|
| 1 | NBPSL#1 |
| 2 | NBPSL#2 |
| . . . | . . . |
| Array_f.length − 1 | . . . |

Get the Max NBPSL(n) from Array_NBPSL, get the index n_max=n for Max NBPSL(n):

From the data comparison, the Max NBPSL from Table#2, and the corresponding n_max for the Max NBPSL, refer to below Table#3. There's some routine in programming to process array data get the n_max and Max NBPSL accordingly.

TABLE #3

| Index# | NBPSL |
|---|---|
| 1 | NBPSL#1 |
| 2 | NBPSL#2 |
| . . . | . . . |
| n_max | Max NBPSL |
| . . . | . . . |
| Array_f.length − 1 | . . . |

Get the Max deformation force from Array_f(n_max):
After calculating the n_max from above step, go back to Table#1, and based on the n_max to get the corresponding Max deformation force, as noted below:

TABLE #4

| Index# | Height# | Force# |
|---|---|---|
| 1 | Height#1 | Force#1 |
| 2 | Height#2 | Force#2 |
| . . . | . . . | . . . |
| n_max | . . . | Max deformation force |
| . . . | . . . | . . . |
| Array_f.length | . . . | . . . |

Finally, the maximum deformation force is derived based on the above algorithm.

SPC and predictive control component 204 provides the capability of generating various statistical process control (SPC) charts and creating a predictive control model. In addition, SPC and predictive control component 204 provides the capability of monitoring the overall process variability and determining various tolerance thresholds. For example, SPC and predictive control component 204 can monitor the trend of the press force output and predict the variation or change from downstream PCB and compliant pin connector's fabrication process (i.e., influence factor). SPC methodology is applied in order to monitor and control specifications and control limits. Several tools are used in the SPC methodology, including control charts. For example, SPC charts can contain the maximum force of inserted connectors, the control limit, and the specification limit.

In an embodiment, SPC and predictive control component 204 creates an individual and range (IR) chart. An IR chart illustrates the variation between consecutive observations, which is a measure of process variability. The control and specifications limits are data points that corresponds to upper and lower tolerance levels established by the operator for each electronic card assembly and test (ECAT) cycle. Upper and lower tolerance levels may be changed via user interface 121 by the operator. In addition, SPC and predictive control component 204 can store the upper and lower tolerance setting in database 112.

SPC and predictive control component 204 can determine a predictive control model. A predictive control model is a model used to analyze and forecast the trend of maximum deformation forces in order to provide real time SPC control of downstream PCB and connector processes. In addition, predictive control model can be used to determine feedback for a lot, suggested material kitting and press-fit machine settings. Furthermore, the predictive control model can be used to summarize the average force response from each connector lot number and PCB lot number. In an embodiment, SPC and predictive control component 204 can collect a plurality of data which can include, but is not limited to, influence parameter data of a PCB (e.g., press fit hole diameter) and an influence parameter of a connector (e.g., eye of needle size). In another embodiment, SPC and predictive control component 204 can collect abnormal data pattern based on at least the following: a Cumulative Summary (CuSum) statistic, a correlation between ECAT press force trend, a PCB fabrication process trend (e.g., drilled hole size, finished hole size, plated-through hole (PTH) copper thickness and surface roughness, etc.), a completed lot quality information and a compliant pin connector fabrication process trend (e.g., compliant pin size, true position, etc.). In yet another embodiment, other data can be collected and analyzed after the lot information is entered into the process after incoming quality control (IQC) inspection SPC and predictive control component 204 uses the collected data to create the predictive control model.

Reasoning component 205 provides the capability of monitoring the overall process variability and determining various tolerance thresholds. In an embodiment, reasoning component 205 retrieves data from SPC and predictive control component 204 (predictive control model) and press log analysis algorithm component 203. After retrieving the data, reasoning component 205 determines whether the data is within the specifications by a multi-step analytical process. Reasoning component 205 determines whether the calculated data are within the upper and lower tolerance level of the pre-defined specifications and SPC control. For example, the upper control limit (UCL) is set to 3.901 newton (N) and the lower control limit (LCL) is set to 2.87 newton (N) and the retrieved force data from the press fit machine is five newton (N). After comparing the IR chart, produced by the SPC and predictive control component 204, against the UCL and LCL, reasoning component 205 determines the deformation force exceeds the UCL.

In another embodiment, reasoning component 205 can determine a corrective action required on non-conformance items. For example, after determining that the inserted pin was bent on the last lot, reasoning component 205 alerts a downstream process of the incoming defect. The downstream process can include, but is not limited to, a PCB fabrication station, a PCB quality team, a connector quality team and a connector fabrication station.

Kitting component 206 provides the capability of assessing raw material quality and provide control over inventory selection. Material kitting is the process of pulling the manufacturing material from a warehouse and then releasing the material to production use. Kitting component 206 manages the kitting process to minimize the possibility of potential failure. For example, when there is a work order (WO) build request, kitting component 206 analyzes all the combinations of parameters of all available PCBs and connector lots in stock and kitting component 206 recommends and schedule the optimal group of PCB lots and connector lots for material kitting.

Figure 3:
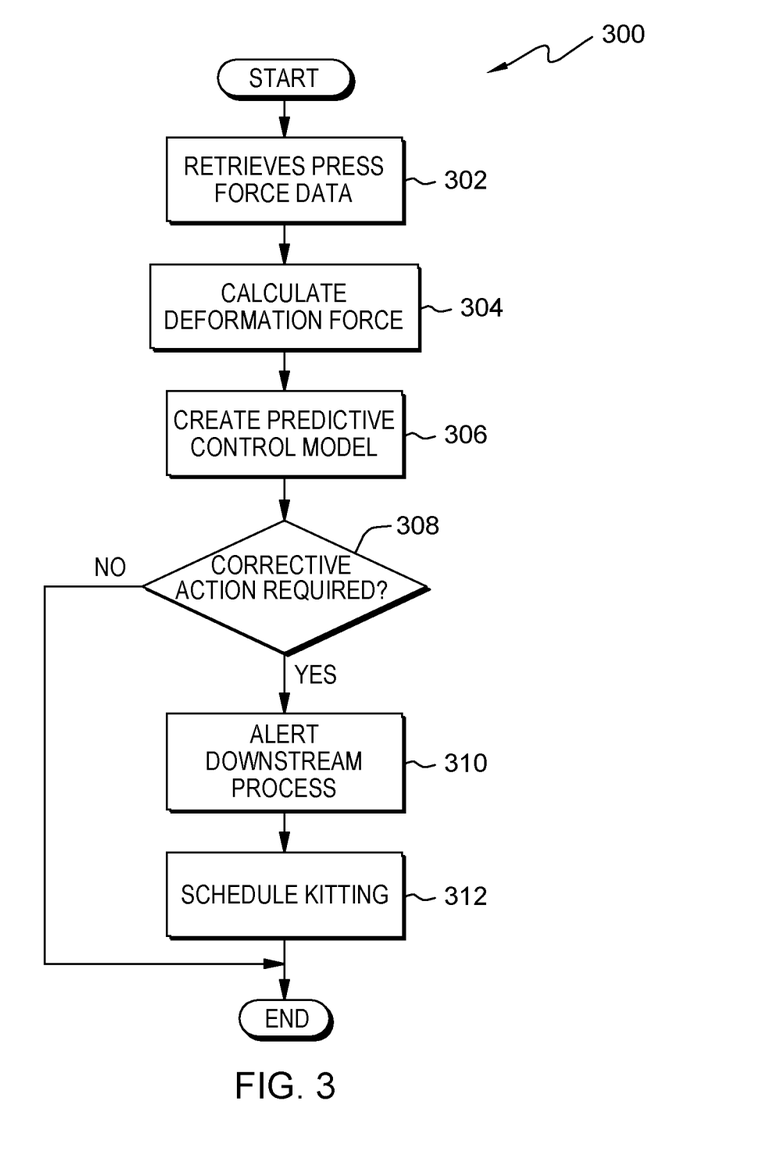
FIG. 3 is a flowchart depicting operational steps of a method for cognitive press-fit analyzer, in accordance with an embodiment of the present invention.

FIG. 3 is flowchart 300 depicting operational steps of a program, on a server computer within the cognitive press-fit analyzer data processing environment of FIG. 1, for cognitive press-fit analyzer, in accordance with an embodiment of the present invention.

Cognitive press-fit component 111 through press-fit machine communication component 202 retrieves the press force data from the machine (step 302). After each ECAT press fit cycle, a press log is generated by the press machine indicating the actual force at the corresponding press distance and press height. In an embodiment, cognitive press-fit component 111 retrieves the press log data from the press fit machine via network 103. For example, cognitive press-fit component 111 retrieves a press log document from a Tyco MEP-12T press fit machine after each ECAT press fit cycle.

Cognitive press-fit component 111, through press log analysis algorithm component 203, calculates the deformation force of the press force data (step 304). In an embodiment, cognitive press-fit component 111 calculates the maximum deformation force of each cycle by utilizing a formula within press log analysis algorithm component 203. Cognitive press-fit component 111 stores the result of the calculation in database 112.

Cognitive press-fit component 111, through SPC and predictive control component 204, creates the predictive control model (step 306). In an embodiment, cognitive press-fit component 111, through SPC and predictive control component 204, creates the predictive control model from the press-fit machine data. Cognitive press-fit component 111 stores the predictive control model and other SPC data in database 112.

Cognitive press-fit component 111, through reasoning component 205, determines if the results requires corrective action (decision block 308). In an embodiment, cognitive press-fit component 111, through the reasoning component 205, compares the results from the machine data against established tolerances.

If cognitive press-fit component 111 determines that corrective action is not required ("no" branch, decision block 308) then cognitive press-fit component 111 ends.

If press-fit component 111 determines that correction action is required ("yes" branch, decision block 305) then cognitive press-fit component 111 alerts the downstream process (step 310).

Cognitive press-fit component 111 alerts the downstream process (step 310). In an embodiment, after determining that the result of the ECAT cycle is not within the predefined tolerances (e.g., a corrective action is required), cognitive press-fit component 111 alerts the downstream process. Cognitive press-fit component 111 sends a pre-alert message to the PCB quality team and connector quality team for further improvement actions. In addition, the pre-alert message will also be stored in database 112 for future query and trend analysis. In another embodiment, cognitive press-fit component 111 can automatically change the force setting of press-fit machine 130 for the next cycle. For example, the last lot produced by press-fit machine 130 was defective due to a high press force, cognitive press-fit component 111 can change the press force setting to a lower setting based on the reasoning component 205 in order to lower defects in the next lot run.

Cognitive press-fit component 111 through kitting component 206 schedules material kitting (step 312). In an embodiment, cognitive press-fit component 111 uses the predictive control model to recommend the best group of PCB lots and connector lots for material to minimize the possibility of failure based on the data analysis of available influence parameters (connectors and PCBs). For example, the predictive control model will display the force trend chart by connector lot number and PCB lot number. The predictive control model will then summarize the average force response from each connector lot number and PCB lot number, respectively. Using the average force response by material lot number, the predictive control model can provide the optimal connector and/or PCB lot identification number to the material kitting, based on the current press force situation. In a further example, if the current press force is beyond nominal, then the predictive model will suggest the corresponding connector lot identification number and/or PCB lot identification number that will generate lower press force, so that the current press force can be reduced.

Figure 4:
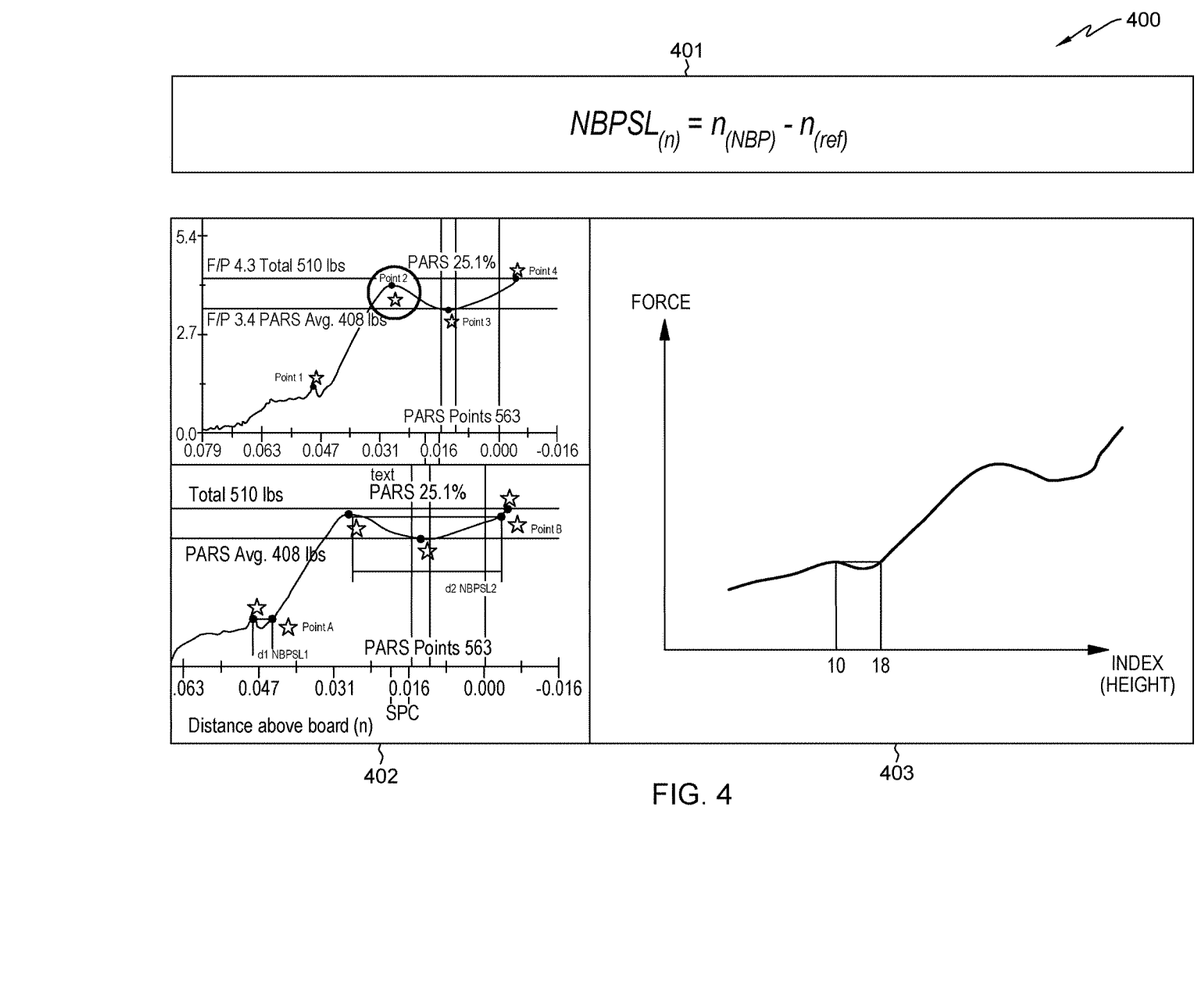
FIG. 4 is an example of the algorithm used by a program, on a server computer within the cognitive press-fit analyzer data processing environment of FIG. 1, for cognitive press-fit analyzer, in accordance with an embodiment of the present invention.

FIG. 4 contains examples of press force derivation 400 within the cognitive press-fit analyzer data processing environment 100 of FIG. 1, in accordance with an embodiment of the present invention.

Press log analysis algorithm 401 utilizes a formula, $NBPSL(n)=n(NBP)-n$, to calculate the maximum deformation force from the output of the press fit machine. Two force charts, force versus distance 402 and press force versus NBPSL chart 403, are used to illustrate the basis for the derivation of the formula of press log analysis algorithm 401.

Figure 5:
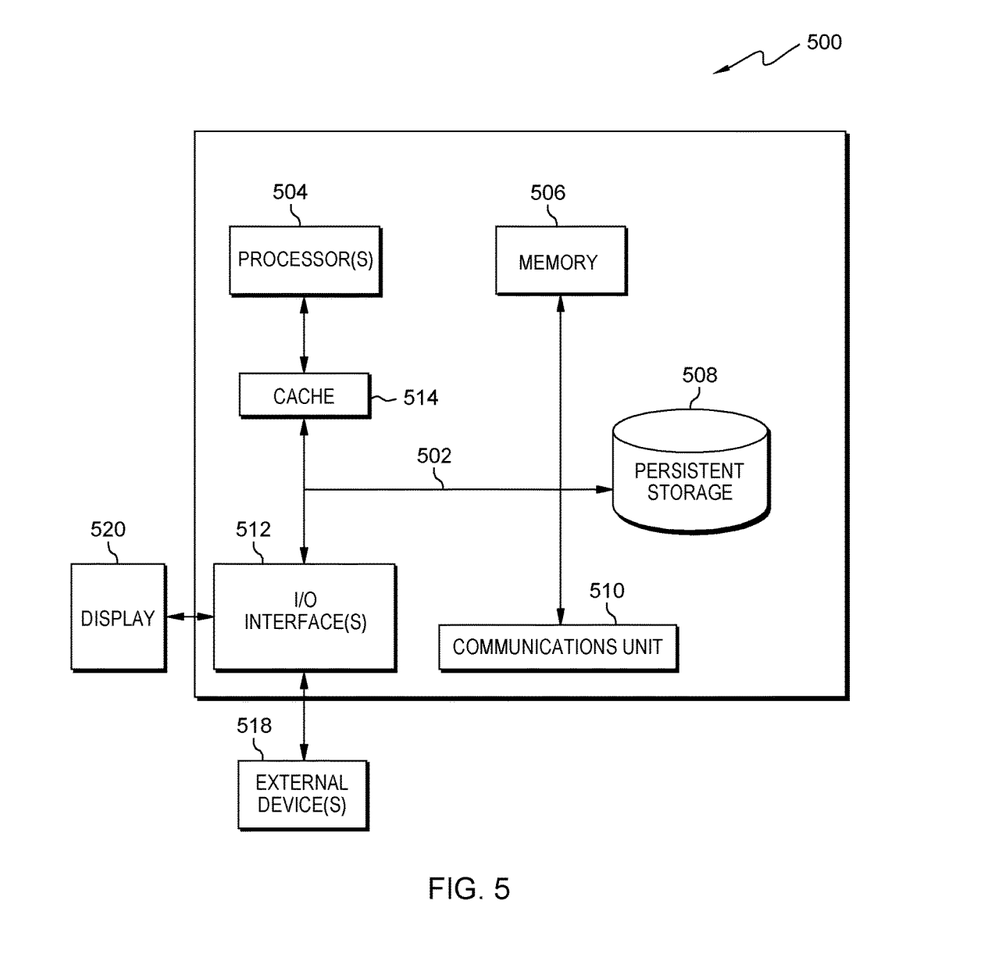
FIG. 5 depicts a block diagram of components of the server computer executing the program within the cognitive press-fit analyzer data processing environment of FIG. 1, in accordance with an embodiment of the present invention.

FIG. 5 depicts a block diagram of components of press-fit force server 110 within press-fit data environment 500, in accordance with an embodiment of the present invention. It should be appreciated that FIG. 5 provides only an illustration of one implementation and does not imply any limitations with regard to the environments in which different embodiments can be implemented. Many modifications to the depicted environment can be made.

Press-fit force server 110 can include processor(s) 504, cache 514, memory 506, persistent storage 508, communications unit 510, input/output (I/O) interface(s) 512 and communications fabric 502. Communications fabric 502 provides communications between cache 513, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM). In general, memory 506 can include any suitable volatile or non-volatile computer readable storage media. Cache 514 is a fast memory that enhances the performance of processor(s) 504 by holding recently accessed data, and data near recently accessed data, from memory 506.

Program instructions and data used to practice embodiments of the present invention, e.g., press-fit component 111 and database 112, can be stored in persistent storage 508 for execution and/or access by one or more of the respective processor(s) 504 of press-fit force server 110 via memory 506. In this embodiment, persistent storage 508 includes a magnetic hard disk drive. Alternatively, or in addition to a magnetic hard disk drive, persistent storage 508 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including resources of client computing device 120. In these examples, communications unit 510 includes one or more network interface cards. Communications unit 510 may provide communications through the use of either or both physical and wireless communications links. Press-fit component 111 and database 112 may be downloaded to persistent storage 508 of press-fit force server 110 through communications unit 510.

I/O interface(s) 512 allows for input and output of data with other devices that may be connected to press-fit force server 110. For example, I/O interface(s) 512 may provide a connection to external device(s) 518 such as a keyboard, a keypad, a touch screen, a microphone, a digital camera, and/or some other suitable input device. External device(s) 518 can also include portable computer readable storage media such as, for example, thumb drives, portable optical or magnetic disks, and memory cards. Software and data used to practice embodiments of the present invention, e.g., press-fit component 111 and database 112 on press-fit force server 110, can be stored on such portable computer readable storage media and can be loaded onto persistent storage 508 via I/O interface(s) 512. I/O interface(s) 512 also connect to a display 520.

Display 518 provides a mechanism to display data to a user and may be, for example, a computer monitor or the lenses of a head mounted display. Display 518 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for cognitive press-fit force analysis, the method comprising:
    retrieving, by one or more computer processors, press-fit data associated with a press-fit machine and based on a press cycle;
    calculating, by one or more computer processors, a deformation force of the press cycle based on the press-fit data, wherein determining the deformation force is based on $$NBPSL_{(n)} = n_{(NBP)} - n_{(ref)}$$

wherein $n_{(ref)}$ is an index of a reference deformation force data point; $n_{(NBP)}$ is an index of a subsequent deformation force data point with a greater deformation force; and $NBPSL_{(n)}$ is a difference in the index of the subsequent deformation force data point and the reference deformation force data point; and
    determining a maximum deformation force comprises:
        storing a plurality of NBPSL values and the index of the reference deformation force data point;
        determining a maximum NBPSL value; and
        retrieving the maximum deformation force based on the index of the reference deformation force data point associated with the maximum NBPSL value;
    and storing the deformation force in a database further comprises at least one of pre-defined specifications of a press force, a predictive control model, a PCB (printed circuit board) lot parameter, a data parameter from a connector lot, a work order for a warehouse inventory station or a message associated with alerting a downstream process;

creating, by one or more computer processors, the predictive control model based on the deformation force, further comprises:
  receiving, by the one or more computer processors, at least one of a raw material quality data, a machine setting data, or a completed lot quality data wherein the raw material quality data further comprises at least one of a PCB lot parameter, a data parameter from a connector lot, a compliant pin connector data;
    wherein the machine setting data further comprises the press-fit data; and
    wherein the completed lot quality data further comprises at least one of cumulative summary statistics data, an ECAT (electronic card assembly and test) press force trend, a PCB fabrication process trend or a compliant pin connector fabrication process trend;

and updating, by the one or more computer processors, the predictive control model based on at least one of the raw material quality data, the machine setting data, or the completed lot quality data;

determining, by one or more computer processors, if a corrective action is required based on at least one of the raw material quality data, the machine setting data, the completed lot quality data or the predictive control model where determining the correction action further comprises:
  sending, by the one or more computer processors, an optimal press force setting towards the press-fit machine; and
  sending, by the one or more computer processors, a failure analysis information towards a quality inspection station based on at least one of the predictive control model or the completed lot quality data;

responsive to determining the corrective action is required, alerting, by one or more computer processors, the downstream process to take the corrective action, further comprises of sending a message to at least one of a PCB fabrication station, a PCB quality team, a connector quality team or a connector fabrication station;

scheduling, by one or more computer processors, a material kitting based on at least one of the raw material quality data, the machine setting data, the completed lot quality data or the predictive control model, further comprises:
  receiving, by the one or more computer processors, at least one of PCB requirements data or connector requirements data;
  comparing, by the one or more computer processors, at least one of the PCB requirements data or the connector requirements data against raw material inventory data;
  responsive to the comparing, determining, by the one or more computer processors, a connector lot identification and a PCB lot identification based on an optimal matching data set; and
  responsive to determining the connector lot identification and the PCB lot identification, generating, by the one or more computer processors, the work order based on the connector lot identification and the PCB lot identification and sending the work order towards a warehouse inventory station.

* * * * *